United States Patent
Shimizu et al.

(10) Patent No.: US 7,321,577 B2
(45) Date of Patent: Jan. 22, 2008

(54) MOBILITY MANAGEMENT SYSTEM BY DISTRIBUTED MOBILE IP

(75) Inventors: Keiichi Shimizu, Tokyo (JP); Masatsugu Yano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 812 days.

(21) Appl. No.: 10/492,849

(22) PCT Filed: May 15, 2003

(86) PCT No.: PCT/JP03/06073

§ 371 (c)(1),
(2), (4) Date: Apr. 16, 2004

(87) PCT Pub. No.: WO2004/025908

PCT Pub. Date: Mar. 25, 2004

(65) Prior Publication Data

US 2004/0252653 A1 Dec. 16, 2004

(30) Foreign Application Priority Data

Sep. 13, 2002 (JP) ............................ 2002-267786

(51) Int. Cl.
*H04Q 7/24* (2006.01)
(52) U.S. Cl. ...................... 370/338; 370/401; 709/217; 709/238
(58) Field of Classification Search ............... None
See application file for complete search history.

(56) References Cited

U.S. PATENT DOCUMENTS 6,473,411 B1 10/2002 Kumaki et al.

(Continued)

FOREIGN PATENT DOCUMENTS

JP 11-266278 A 9/1999

OTHER PUBLICATIONS

C. Perkins, "RFC2002: IP Mobility Support", Oct. 1996.

(Continued)

*Primary Examiner*—Bob A. Phunkulh
(74) *Attorney, Agent, or Firm*—Birch, Stewart, Kolasch & Birch, LLP

(57) ABSTRACT

In the Mobile IPv4 network in the present invention, FA control servers (7*a*, 7*b*) that process only Mobile IP signaling, and IP tunnel routers (8*a*, 8*c*), being an IP tunnel endpoint, which also function as a default router with respect to a mobile node MN, form an FA function (referred to as a virtual FA). Further, an HA control server (9) that processes only Mobile IP signaling, and an IP tunnel router (8*b*), being an IP tunnel endpoint, form an HA function (referred to as a virtual HA). Here, the relation between the FA control servers (7*a*, 7*b*) and the IP tunnel routers (8a, 8*c*), and the relation between the HA control server (9) and the IP tunnel router (8*b*) are such that the former is a Media Gateway Controller (MGC) and the latter is a Media Gateway (MG). The FA control server (7*a*) notifies a mobile node MN (2) of the own address as an FA care-of address, in the form of a regular broadcast or query response. The IP tunnel router (8*a*) constituting the virtual FA notifies the mobile node MN (2) of an address, being a default router, in the form of a regular broadcast or query response.

16 Claims, 13 Drawing Sheets

U.S. PATENT DOCUMENTS

| | | | |
|---|---|---|---|
| 6,842,462 B1* | 1/2005 | Ramjee et al. | 370/466 |
| 6,973,057 B1* | 12/2005 | Forslow | 370/328 |
| 2001/0016492 A1* | 8/2001 | Igarashi et al. | 455/433 |
| 2001/0053694 A1* | 12/2001 | Igarashi et al. | 455/433 |
| 2002/0191593 A1* | 12/2002 | O'Neill et al. | 370/352 |
| 2003/0053453 A1* | 3/2003 | Ono et al. | 370/389 |
| 2004/0052238 A1* | 3/2004 | Borella et al. | 370/349 |

OTHER PUBLICATIONS

James D. Solomon, "Shosai Mobile IP", 1st Edition, 1998, Chapter 5, Kabushiki Kaisha Prentice Hall Shuppan.

Mitsuaki Kakemizu et al., "Ido Tsushin o Base to suro Togo IP Service Seigyo Architecture", The Institute of Electronics, Information and Communication Engineers Gijutsu Kenkyu Hokoku, SSE99-104, Nov. 16, 1999, Chapter 3.

* cited by examiner

MOBILITY MANAGEMENT SYSTEM BY DISTRIBUTED MOBILE IP

TECHNICAL FIELD

The present invention relates to a mobility management technique for mobile packet communication.

BACKGROUND ART

Mobile IP (RFC 2002) has been suggested in the Internet Engineering Task Force (IETF), as a method for maintaining communication without interrupting the session by a mobile node MN, when a terminal having an IP address moves across a subnet (see "RFC 2002: IP Mobility Support" by C. Perkins, IETF Internet Draft, 1996/10, pages 8 to 11).

This concept is explained in detail in "Detailed Mobile IP" (see "Detailed Mobile IP" by James D. Solomon, Pearson Education Japan, Jul. 27, 1998, pages 57 to 77).

FIG. 13 illustrates an example of communication using the Mobile IP. Reference sign 1a denotes an IP subnetwork, 1b denotes an IP subnetwork belonging to a subnet different from the IP subnetwork 1a, 2 denotes a mobile node MN mounted with the Mobile IP, 3a and 3b denote access points accommodating the mobile node, 4 denotes a Mobile IP foreign agent (FA), 5 denotes a home agent (HA) controlling the position of the mobile node 2 as the IP address of the FA, and 6 denotes a communication partner node (CN) communicating with the mobile node.

In the Mobile IP, the HA 5 is arranged in the home domain of the mobile node (MN) 2, and an IP address belonging to this home domain (hereinafter, "home address") is allocated to the mobile node (MN) 2 in a fixed manner. The FA address at which the mobile node (MN) 2 is present is controlled by the HA 5 as a position of the mobile node (MN) 2. Therefore, the mobile node (MN) 2 registers in the HA a new FA address (referred to as an FA care-of address) as an address to which the mobile node (MN) 2 moves, via the new FA, at a timing of detecting that the mobile node (MN) 2 moves from under a supervision of the old FA to under the new FA.

When the CN 6 transmits an IP packet to the mobile node (MN) 2, the HA 5 controlling the FA care-of address of the mobile node (MN) 2 captures the packet addressed to the home address of the mobile node (MN) 2, and transfers the captured IP packet to the registered FA 4 through an IP tunnel. The transfer through the IP tunnel stands for encapsulating the IP packet received by the HA with an IP header having:

a sender address: IP address of the HA 5, and a destination address: FA care-of address, and transferring it to the FA. Upon reception of the encapsulated IP packet, the FA 4 takes out the original IP packet therefrom, and transfers it to the mobile node (MN) 2. By this mechanism, movement transparency of the mobile node (MN) 2 is realized in the Mobile IP.

When the mobile node (MN) 2 obtains the IP address in the subnet at the moving destination, the mobile node (MN) 2 can directly register this IP address (referred to as a collocated care-of address) as an address to which the mobile node (MN) 2 moves, in the HA 5. In this case, the IP tunnel is set not between the FA 4 and the HA 5, but between the mobile node (MN) 2 and the HA 5.

The IP packet transmission from the mobile node (MN) 2 to the CN 6 is performed by transmission via a normal routing or by transmission via the IP tunnel.

In the conventional configuration, since the FA and the HA have functions of signaling processing of the Mobile IP and IP tunnel transfer processing of a user packet, the load concentrates on these parts.

Generally, the next-generation network has a network configuration in which a control plane for performing signaling processing, and a user plane for performing user packet processing are separately mounted. In such a distributed network, independent development of the signaling processing and the user packet processing, realization of scalability of each plane, realization of load balancing on each plane, low cost of the general-purpose user packet processor, and high performance and low cost by realizing the signaling processing on a general-purpose computer are expected. However, the Mobile IP does not assume such a distributed network, and hence expansion to the next-generation network is difficult.

Particularly, in the Mobile IP, the FA assumes a message informing the own address, and the mobile node MN regards the sender IP/MAC addresses in this message as the FA, to perform position registration signaling, and also regards it as a default router to transmit the user data. This indicates that one IP address is used for both signaling and user packet processing, and hence the control plane and the user plane cannot be separated.

Further, it is not specified how the address information informed by the position registration from the mobile node MN to the HA is handled, when the control plane and the user plane are separated.

With regard to the procedure when the mobile node MN does not know the address of the HA control server, it is not specified how it is changed, when the control plane and the user plane are separated.

DISCLOSURE OF THE INVENTION

It is an object of the present invention to at least solve the problems in the conventional technology.

A mobility management system according to one aspect of the present invention uses a distributed Mobile IP, in a Mobile IP network which allows a mobile node while moving to hold a current communication session. The mobility management system includes a foreign agent control server that is located in a first subnet where the mobile node is located, performs Mobile IP signaling; a first IP tunnel router that is located in the first subnet, and performs IP tunnel transfer; a home agent control server that is located in a second subnet where the mobile node is located, and performs Mobile IP signaling; and a second IP tunnel router that is located in the second subnet, and performs IP tunnel transfer. The foreign agent control server and the first IP tunnel router constitute a virtual foreign agent. The home agent control server and the second IP tunnel router constitute a virtual home agent.

A mobility management system according to another aspect of the present invention uses a distributed Mobile IP, in a Mobile IP network which allows a mobile node while moving to hold a current communication session. The mobility management system includes an access router control server that is located in a first subnet where the mobile node (MN) is located, performs Mobile IP signaling; a first IP tunnel router that is located in the first subnet, and performs IP tunnel transfer; a home agent control server that is located in a second subnet where the mobile node is located, and performs Mobile IP signaling; and a second IP tunnel router that is located in the second subnet, and performs IP tunnel transfer. The access router control server and the first IP tunnel router constitute a virtual access router. The home agent control server and the second IP tunnel router constitute a virtual home agent.

The other objects, features, and advantages of the present invention are specifically set forth in or will become apparent from the following detailed descriptions of the invention when read in conjunction with the accompanying drawings.

BEST MODE FOR CARRYING OUT THE INVENTION

First Embodiment

Figure 1:
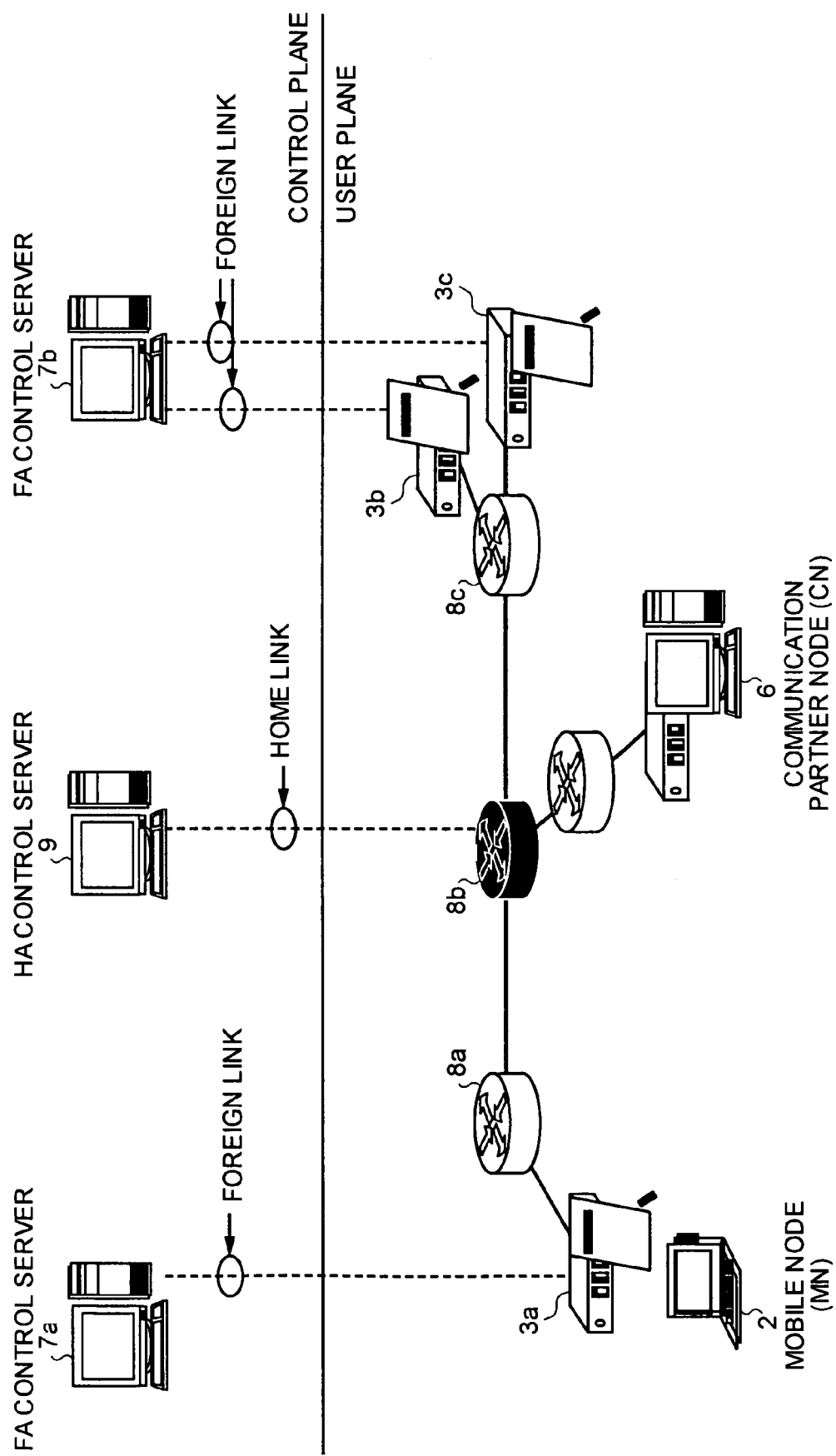
FIG. 1 is a configuration diagram of a Mobile IP network in which a control plane and a user plane are separated, being the prerequisite in the first to the eighth embodiments of the present invention.

FIG. 1 is a configuration diagram of a Mobile IPv4 network in the first embodiment.

Figure 13:
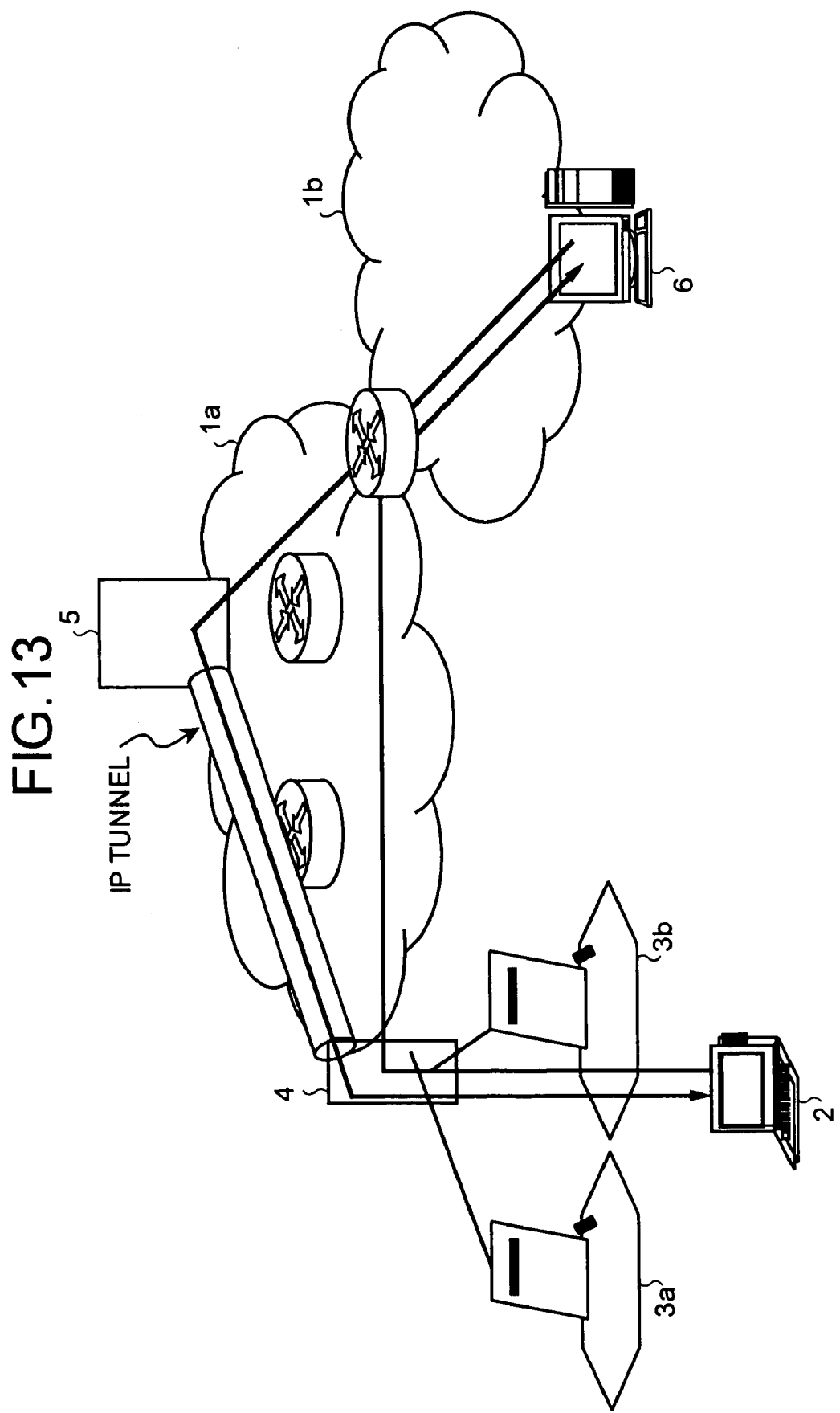
FIG. 13 illustrates the operation of the conventional Mobile IP network.

In FIG. 1, a foreign agent function (hereinafter, "FA function") includes FA control severs 7a and 7b for performing only Mobile IP signaling processing, and IP tunnel routers 8a and 8c for performing only transfer processing of user data. A home agent function (hereinafter, "HA function") includes an HA control server 9 for performing only Mobile IP signaling processing and an IP tunnel router 8b for performing only the transfer processing of user data. The other configuration is the same as that in FIG. 13.

Figure 2:
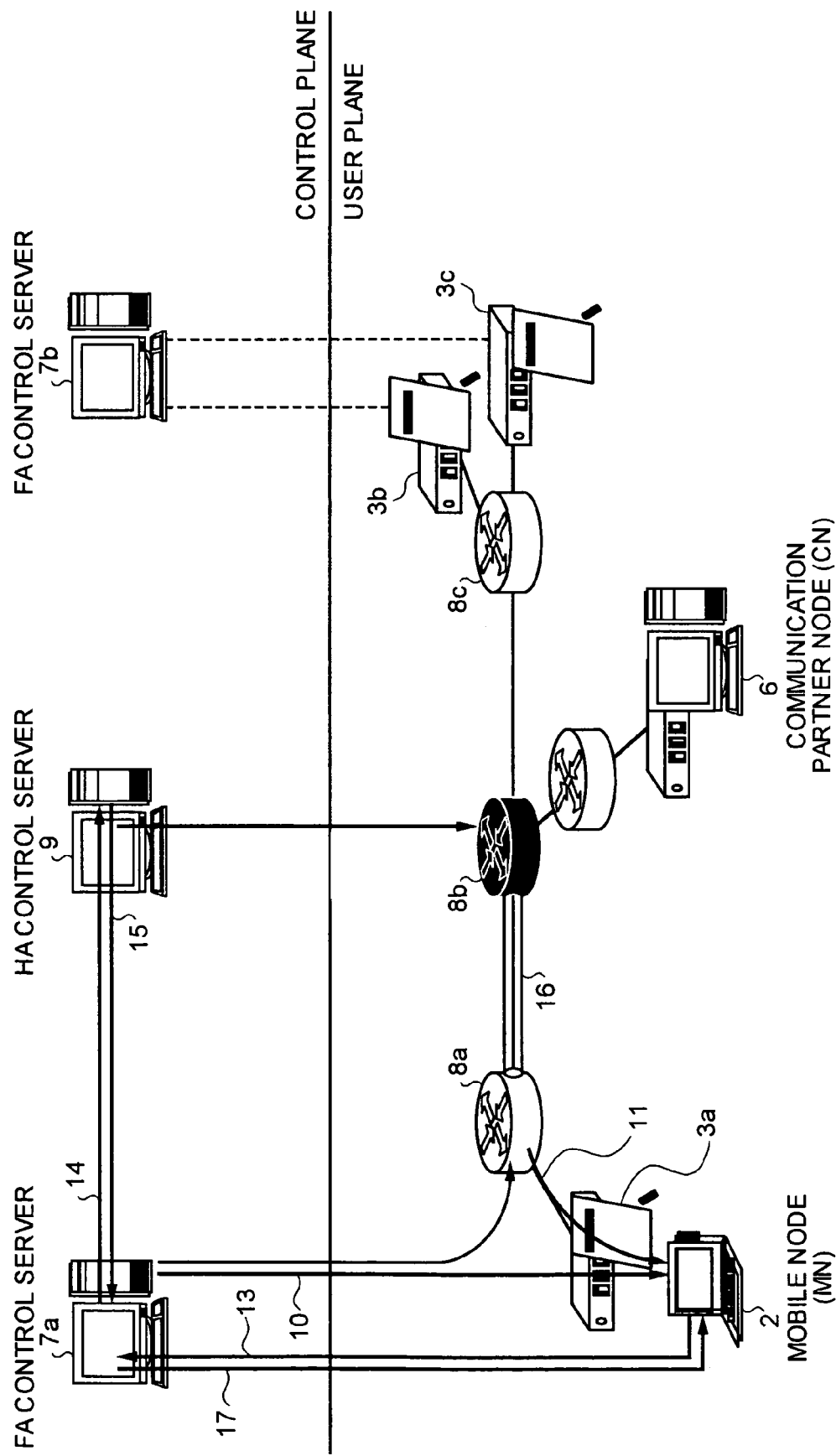
FIG. 2 illustrates a control flow of a distributed Mobile IP in the first embodiment of the present invention.
Figure 3:
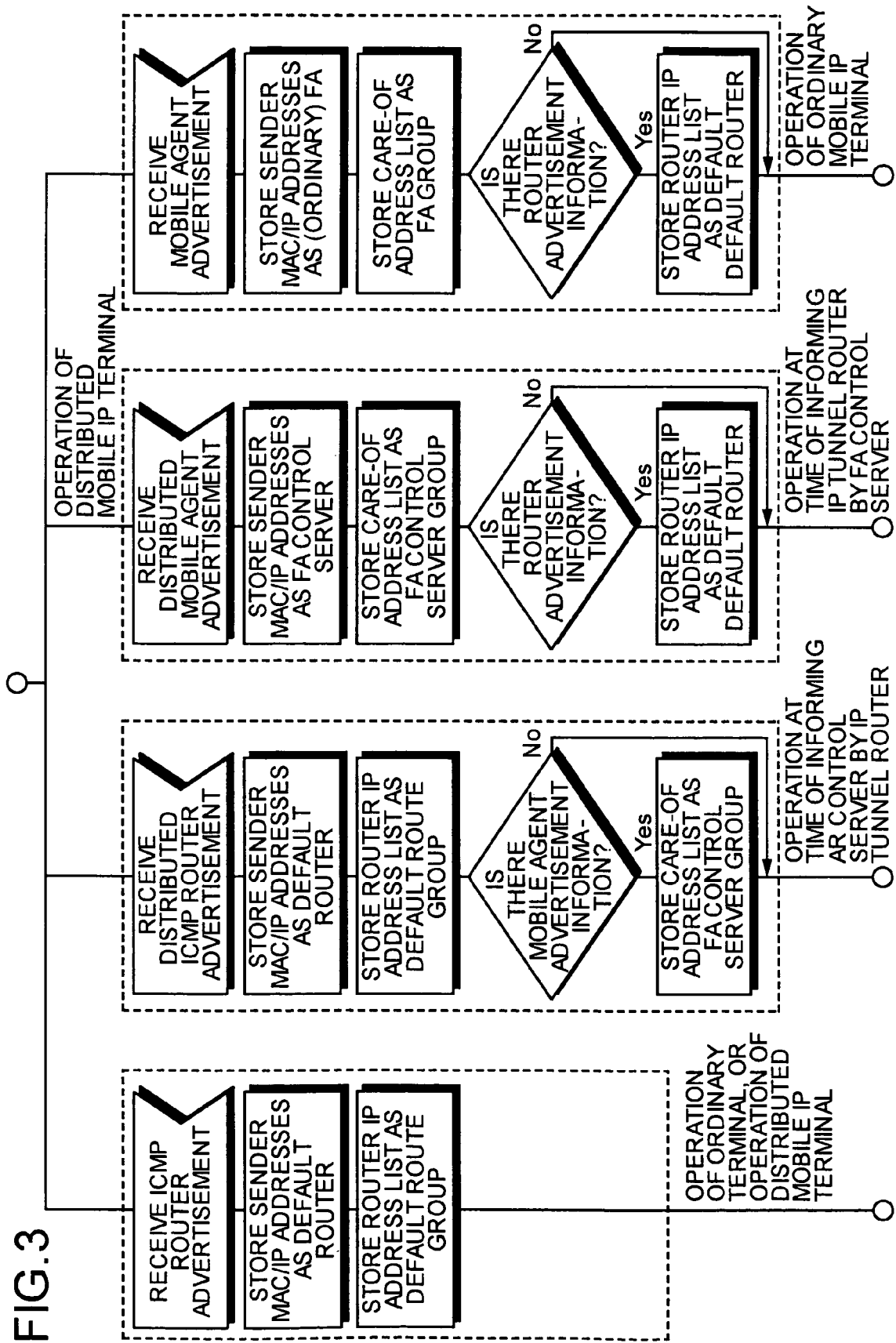
FIG. 3 illustrates the operation at the time of receiving an ICMP message in a mobile node (MN) 2 in the first, and the third to the fifth embodiments of the present invention.
Figure 4:
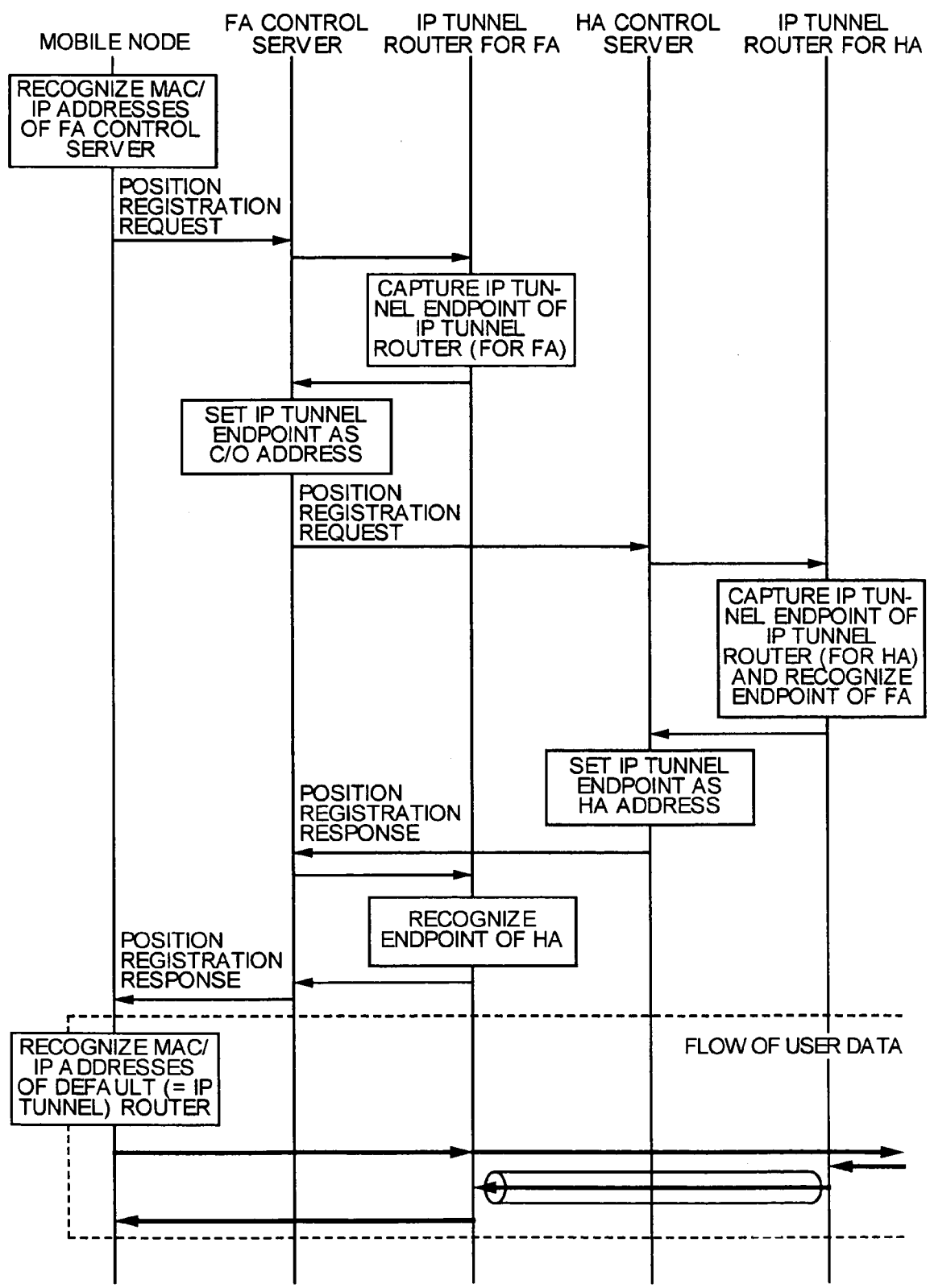
FIG. 4 illustrates a processing flow of each apparatus at the time of executing position registration of the distributed Mobile IP in the first embodiment of the present invention.

FIG. 2 is a conceptual diagram illustrating the entire operation of the Mobile IP in the network in illustrated FIG. 1, FIG. 3 illustrates the operation at the time of receiving an ICMP message by a terminal, and FIG. 4 illustrates an operation flow of each apparatus at the time of position registration.

In this embodiment, the FA control server 7a regularly broadcasts the own address of the FA control server as an FA care-of address, as shown by reference numeral 10 in FIG. 2. The message is a kind of the ICMP message, and is referred to as a distributed mobile agent advertisement. In order to notify a mobile node (MN) 2 that the storage network is the distributed Mobile IP network, a code field value and the like in the message is changed with respect to a normal mobile agent advertisement.

As illustrated in FIG. 3, the mobile node (MN) 2 receives the distributed mobile agent advertisement, and recognizes the sender MAC/IP addresses thereof as the FA control server 7a, being the destination of the position registration signaling. The distributed mobile agent advertisement may be transmitted as a response to an advertisement request message from the mobile node MN.

The IP tunnel router 8a regularly broadcasts the IP address, being a default router, with respect to the mobile node MN, as shown by reference numeral 11 in FIG. 2. The message is a normal ICMP router advertisement message. As illustrated in FIG. 3, the mobile node (MN) 2 receives a router advertisement, and recognizes the sender MAC/IP addresses as the IP tunnel router 8a, being the destination of a user packet. The router advertisement may be transmitted as a response to an advertisement request message from the mobile node MN.

The mobile node MN can respectively recognize the FA control server on the control plane and the IP tunnel router on the user plane, by respectively receiving the distributed mobile agent advertisement and the ICMP router advertisement.

The mobile node MN having recognized the IP addresses of the FA control server 7a and the IP tunnel router 8a creates a position registration message including the IP address information of a known HA control server 9, and transmits it to the MAC/IP addresses of sender of the distributed mobile agent advertisement (reference numeral 13 in FIG. 2). The FA control server 7a receives the position registration message, and obtains the care-of address, being an endpoint of the IP tunnel, in the IP tunnel router 8a after having scrutinized the message. The address may be different from the default router address of the IP tunnel router 8a, and this address is determined by referring to the IP tunnel router 8a. However, when the FA control server 7a controls the resource of the IP tunnel router 8a, the address may be determined independently, without referring to the IP tunnel router 8a.

The FA control server 7a sets the obtained IP tunnel endpoint address in the IP tunnel router 8a as a care-of address in the position registration message, and transfers the position registration message with respect to the address of the HA control server 9 notified from the mobile node MN (reference numeral 14 in FIG. 2). The HA control server 9 having received the position registration message obtains an address as the endpoint of the IP tunnel in the IP tunnel router 8b, after having stored the IP tunnel information in the message. This address is determined by referring to the IP tunnel router 8b. However, when the HA control server 9 controls the resource of the IP tunnel router 8b, the address may be independently determined without referring to the IP tunnel router 8b. The HA control server 9 notifies the IP tunnel router 8b of the IP tunnel endpoint of the opposing IP tunnel router 8a.

The HA control server 9 sets the IP tunnel endpoint address in the obtained IP tunnel router 8b in the position registration response message as a HA address, and transmits it to the FA control server 7a (reference numeral 15 in FIG. 2). The FA control server 7a establishes an IP tunnel (denoted by reference numeral 16 in FIG. 2) between the IP tunnel routers 8a and 8b by notifying the IP tunnel router 8a of the IP tunnel endpoint in the tunnel router 8b. Thereafter, the FA control server 7a transfers the position registration response message to the mobile node (MN) 2 (reference numeral 17 in FIG. 2).

By a series of operation, as illustrated in FIG. 4, a user data path is formed via the IP tunnel routers 8a and 8b.

The FA function virtually includes the FA control server and the IP tunnel router, and the HA function virtually includes the HA control server and the IP tunnel router. Since the FA control server notifies the mobile node (MN) 2 of the own address as the FA care-of address, and the IP tunnel router constituting the FA function notifies the mobile node (MN) 2 of the IP address of the default router, the mobile node (MN) 2 can recognize the FA control server and the IP tunnel router respectively individually. Therefore, a Mobile IP network in which the control plane and the user plane are separated totally from the mobile node (MN) 2 to the HA can be constructed. In the Mobile IP network in which the control plane and the user plane are separated, the load balancing between the control plane and the user plane becomes possible, thereby enabling independent correspondence to upgrade of signaling and speed-up of the tunnel processing. As a result, an optimized system can be constructed. The high-speed system can be provided at low cost, by constructing the control plane on a general-purpose computer system. Since the user plane is cut off from the Mobile IP signaling, the user plane can be general-purpose equipment applicable to a system other than the Mobile IP. As a result, a cheap product can be provided.

When the mobile node (MN) 2 using the FA care-of address performs position registration, since the IP address at the IP tunnel endpoint in the IP tunnel router, being a part of the FA function in the Mobile IP procedure, and the IP address at the IP tunnel endpoint in the IP tunnel router, being a part of the HA function are exchanged, the IP tunnel can be correctly set in the Mobile IP network in which the control plane and the user plane are separated.

Second Embodiment

Figure 5:
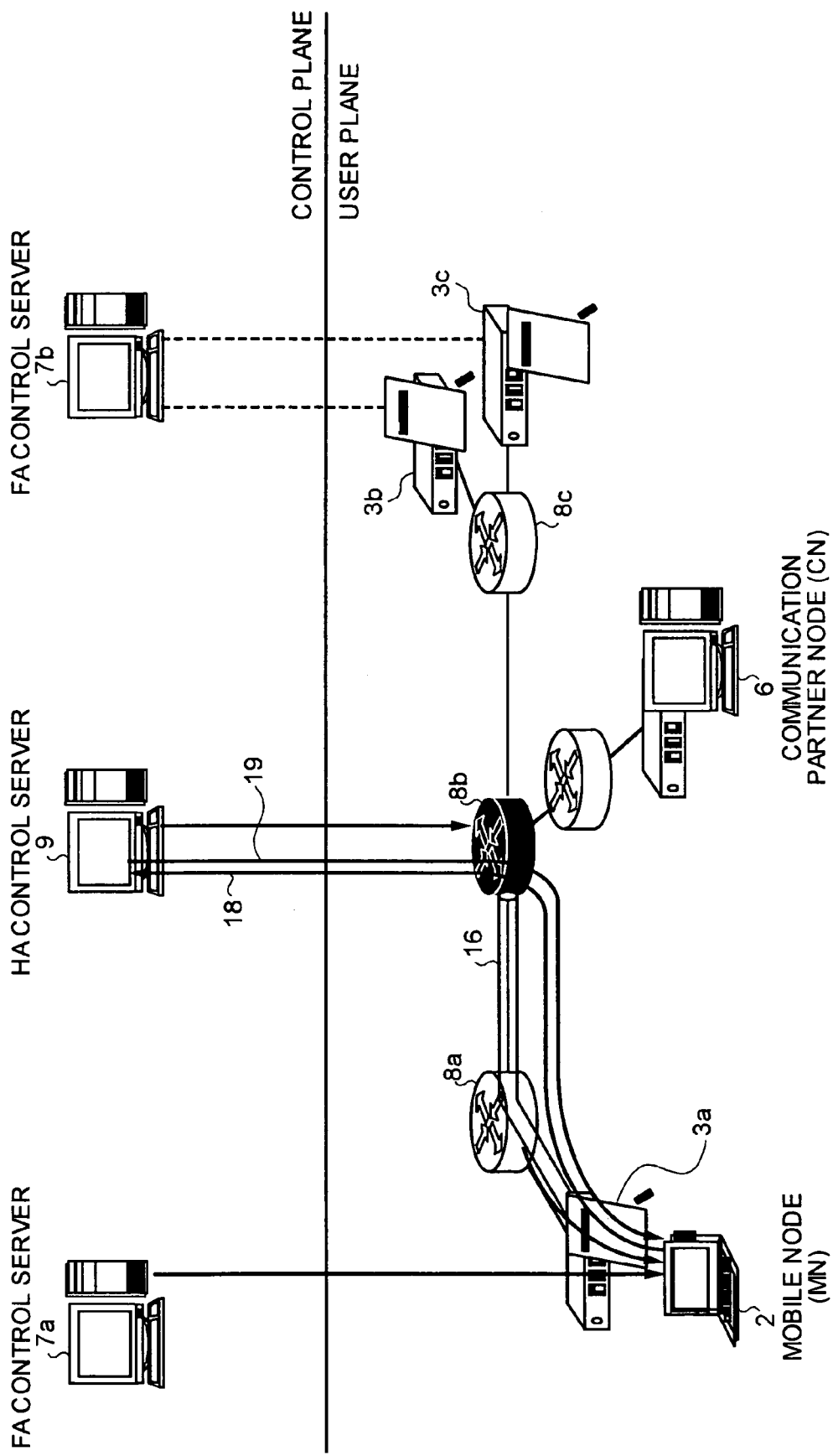
FIG. 5 illustrates a control flow of the distributed Mobile IP in the second embodiment of the present invention.
Figure 6:
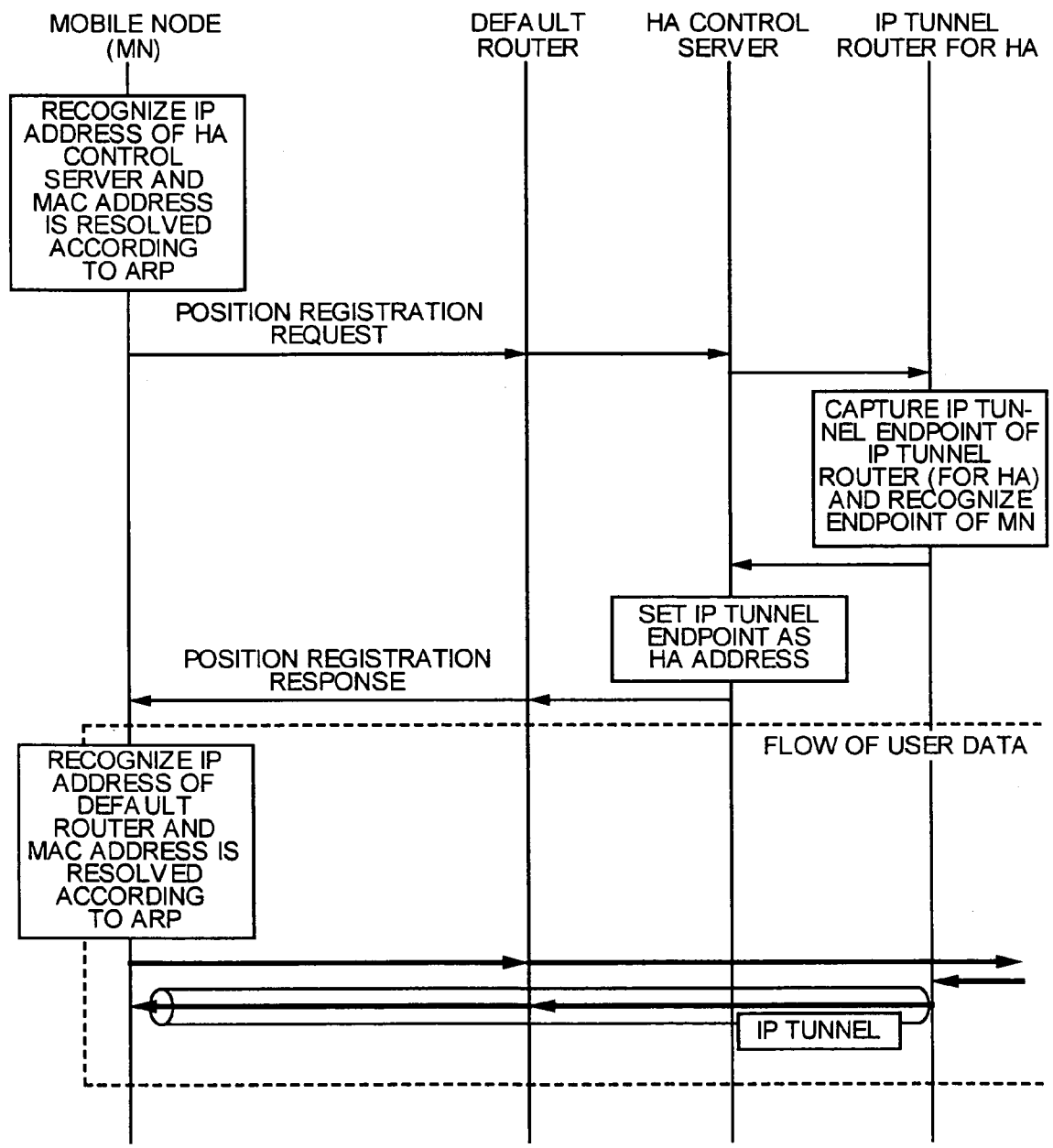
FIG. 6 illustrates a processing flow of each apparatus at the time of executing position registration of the distributed Mobile IP in the second embodiment of the present invention.

FIG. 5 is a conceptual diagram illustrating the entire operation of the Mobile IPv4 network in the second embodiment, and FIG. 6 illustrates an operation flow of each apparatus at the time of the position registration.

In this embodiment, the FA control server 7a and the IP tunnel router 8a notify the mobile node (MN) 2 of information in the same method as in the first embodiment. In the second embodiment, the mobile node (MN) 2 selects to use the collocated care-of address of the Mobile IPv4 or the Mobile IPv6. In this case, the mobile node (MN) 2 creates a position registration message including the own IP address of the mobile node (MN) 2 as the endpoint of the IP tunnel, and transmits the message to the known HA control server 9 (reference numeral 18 in FIG. 5). The HA control server 9 having received the position registration message obtains the address, being the endpoint of the IP tunnel, in the IP tunnel router 8b after having stored the IP tunnel information in the message, in the same method as in the first embodiment. At this time, the HA control server 9 notifies the IP tunnel router 8b of the IP tunnel endpoint of the opposing mobile node (MN) 2.

The HA control server 9 sets the obtained IP tunnel endpoint address in the IP tunnel router 8b in the position registration response message as a HA address, and transmits the message to the mobile node (MN) 2 (reference numeral 19 in FIG. 5). At this point in time, the IP tunnel between the mobile node (MN) 2 and the IP tunnel router 8b (reference numeral 16 in FIG. 5) is established.

By a series of operation, a user data path via the IP tunnel router 8b as illustrated in FIG. 6 is constructed.

When the mobile node (MN) 2 using the collocated care-of address performs position registration, since the IP address of the mobile node (MN) 2 and the IP address of the IP tunnel endpoint in the IP tunnel router, being a part of the HA function are exchanged, the IP tunnel can be correctly set in the Mobile IP network in which the control plane and the user plane are separated.

Third Embodiment

Figure 7:
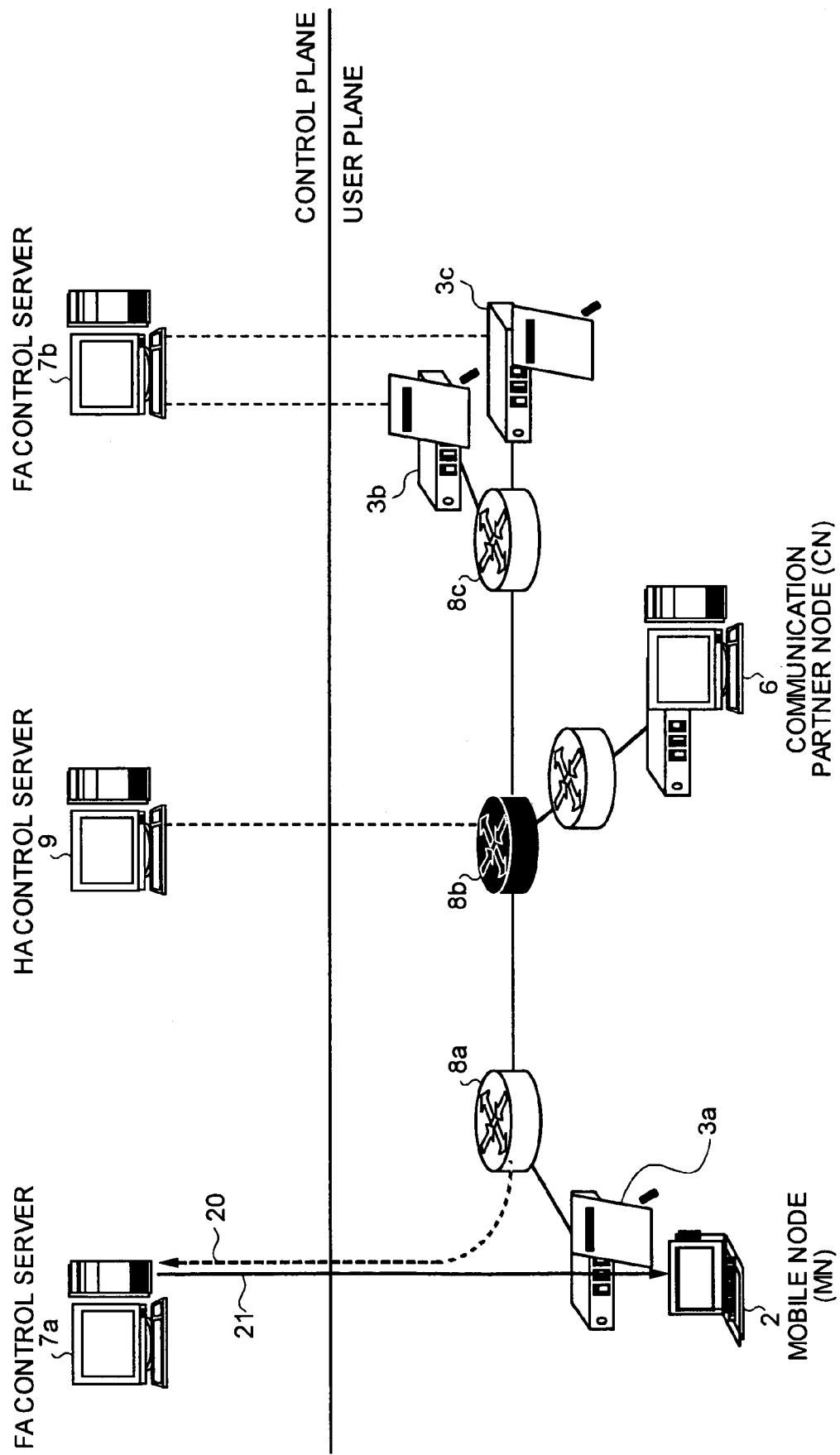
FIG. 7 illustrates a flow of IP address notification of an FA control server and an IP tunnel router in the distributed Mobile IP in the third embodiment of the present invention.

FIG. 7 is a conceptual diagram illustrating the entire operation of the Mobile IPv4/v6 in the third embodiment.

In the embodiment, the FA control server 7a is informed of the IP address as the default router of the mobile node MN by the IP tunnel router 8a (reference numeral 20 in FIG. 7). This is informed at any time, when the apparatus of the IP tunnel router 8a is started up or the operation status of the IP address changes. Alternatively, the FA control server 7a may statically hold the IP address as the configuration data.

In a path 21 illustrated in FIG. 7, when the FA control server 7a regularly broadcasts the own address as the FA care-of address, the FA control server 7a broadcasts the IP address as the default router in the IP tunnel router 8a at the same time. The message is also a kind of the ICMP message and is a distributed mobile agent advertisement. However, the message also includes the ICMP router advertisement information other than the information described in the first embodiment.

As illustrated in FIG. 3, the mobile node (MN) 2 receives the distributed mobile agent advertisement and recognizes the sender MAC/IP addresses as the FA control server 7a, being the destination of the position registration signaling. Further, the mobile node MN recognizes the IP address as the default router from the ICMP router advertisement information.

The mobile node MN can respectively recognize the FA control server on the control plane and the IP tunnel router on the user plane, by receiving the ICMP router advertisement in the distributed mobile agent advertisement. However, since the MAC address is unknown as an address of the IP tunnel router, the mobile node MN needs to resolve the MAC address from the IP address according to ARP. Particularly, there may be a constraint on Mobile IP in which the home address of the mobile node MN cannot be used for ARP. In this case, the mobile node MN using the collocated care-of address can use the mechanism.

Since, the FA control server notifies the mobile node (MN) 2 of the own address as the FA care-of address and the address in the IP tunnel router constituting the FA function as the default router IP address, the mobile node (MN) 2 can respectively recognize the FA control server and the IP tunnel router. Therefore, a Mobile IP network in which the control plane and the user plane are separated totally from the mobile node (MN) 2 to the HA can be constructed.

Particularly, the mobile node (MN) 2 using the collocated care-of address can use this mechanism.

Fourth Embodiment

Figure 8:
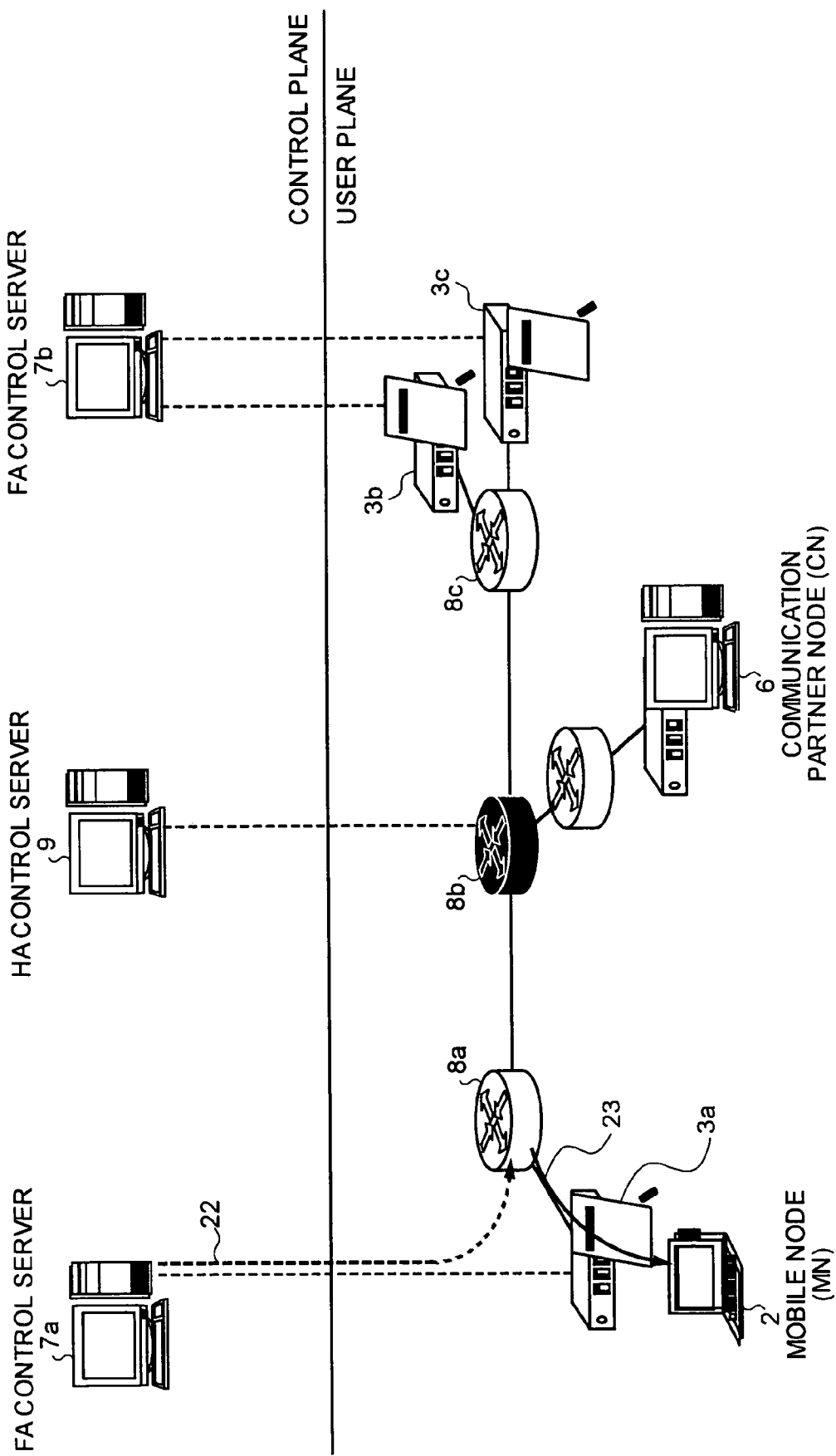
FIG. 8 illustrates a flow of IP address notification of the FA control server and the IP tunnel router in the distributed Mobile IP in the fourth embodiment of the present invention.

FIG. 8 is a conceptual diagram illustrating the entire operation of the Mobile IPv4 in the fourth embodiment.

In this embodiment, the IP tunnel router 8a is informed of the IP address of the FA control server, being the care-of address, by the FA control server 7a (reference numeral 22 in FIG. 8). This is informed at any time, when the apparatus in the FA control server 7a is started up or the operation status of the IP address changes. Alternatively, the IP tunnel router 8a may statically hold the IP address as the configuration data.

In a path 23 in FIG. 8, when regularly broadcasting the IP address, being the default router, to the mobile node MN, the IP tunnel router 8a broadcasts the address of the FA control server 7a as the care-of address at the same time. The message is a kind of the ICMP message and is referred to as a distributed ICMP router advertisement. In order to inform the mobile node MN that the storage network is the distributed Mobile IP network, a code field value and the like in the message is changed with respect to a normal ICMP router advertisement. The message also includes the mobile agent advertisement information other than the information described in the first embodiment. As illustrated in FIG. 3, the mobile node (MN) 2 receives the distributed ICMP router advertisement, and recognizes the sender MAC/IP addresses thereof as the IP tunnel router 8a, being the default router. The mobile node (MN) 2 also recognizes the IP address of the FA control server 7a from the mobile agent advertisement information.

The mobile node (MN) 2 can respectively recognize the FA control server on the control plane and the IP tunnel router on the user plane, by receiving the mobile agent advertisement in the distributed ICMP router advertisement. However, since the MAC address is unknown as the address of the FA control server, the mobile node MN needs to resolve the MAC address from the IP address according to the ARP. Particularly, there may be a constraint on Mobile IP in which the home address of the mobile node MN cannot be used for the ARP. In this case, the mobile node (MN) using the collocated care-of address can use the mechanism.

Since, the IP tunnel router notifies the mobile node (MN) 2 of the FA control server address as the FA care-of address and the own address as the default router IP address, the mobile node (MN) 2 can respectively recognize the FA control server and the IP tunnel router. Therefore, a Mobile IP network in which the control plane and the user plane are separated totally from the mobile node (MN) 2 to the HA can be constructed.

Particularly, the mobile node (MN) 2 using the collocated care-of address can use this mechanism.

Fifth Embodiment

Figure 9:
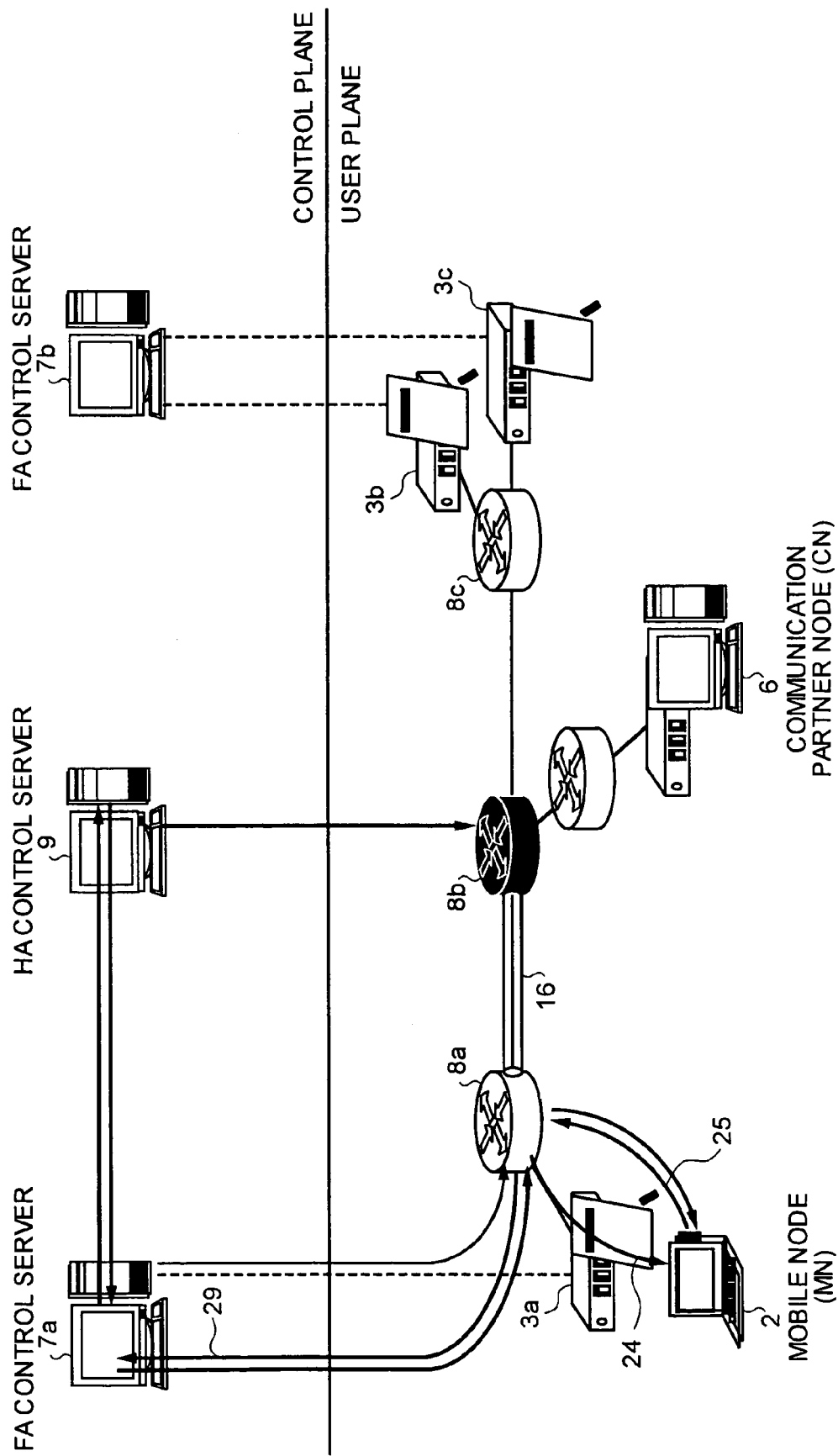
FIG. 9 illustrates a control flow of the distributed Mobile IP in the fifth embodiment of the present invention.
Figure 10:
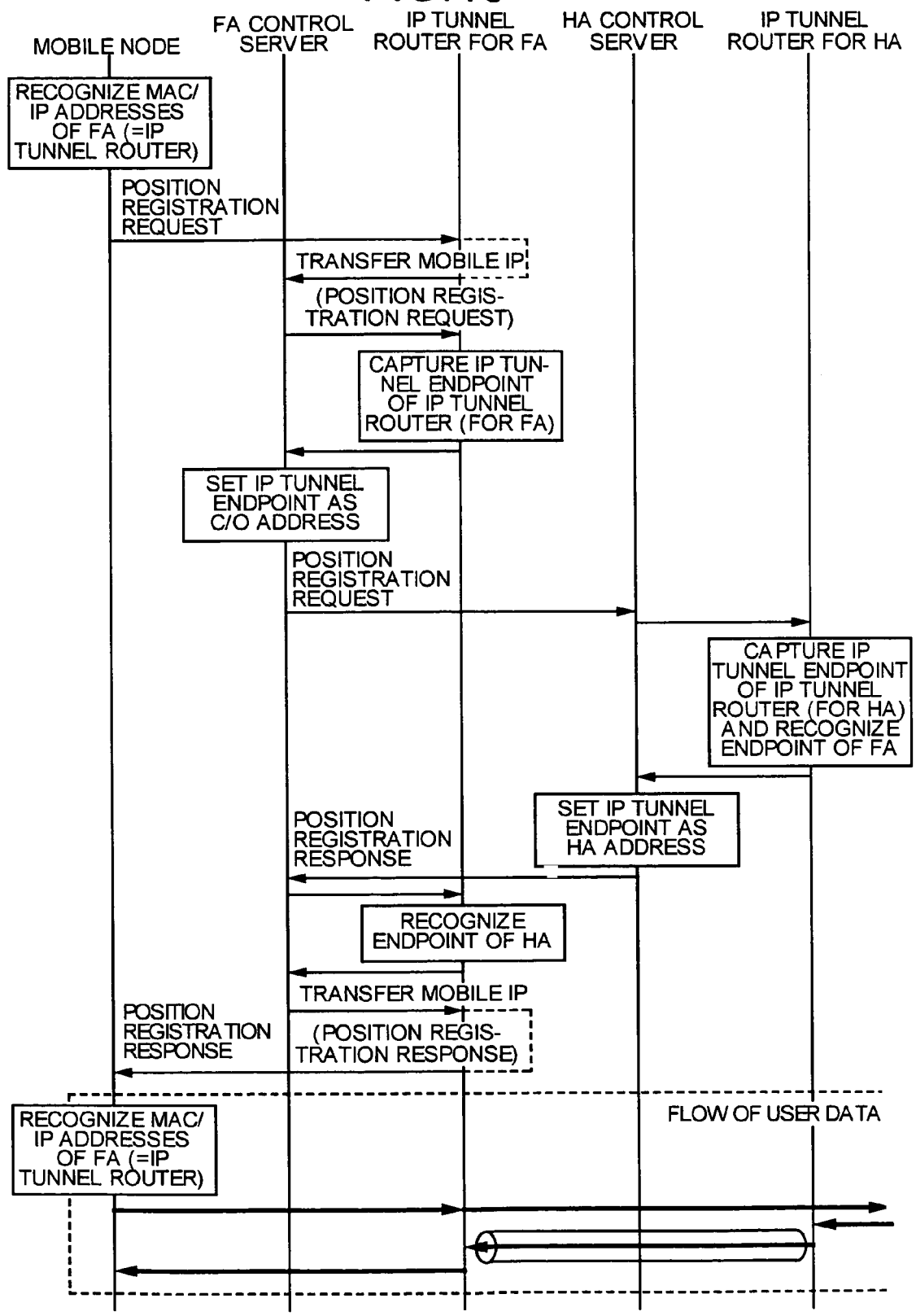
FIG. 10 illustrates a processing flow of each apparatus at the time of executing position registration of the distributed Mobile IP in the fifth embodiment of the present invention.

FIG. 9 is a conceptual diagram illustrating the entire operation of the Mobile IPv4 in the fifth embodiment, and FIG. 10 illustrates the operation flow of each apparatus at the time of executing position registration.

In this embodiment, the IP tunnel router 8a regularly broadcasts the IP address, being the default router, and the care-of address in the IP tunnel router 8a, to the mobile node (MN) 2, via a path 24 in FIG. 9, according to the specifications of the normal Mobile IP. This message is a normal mobile agent advertisement message. As illustrated in FIG. 3, the mobile node (MN) 2 receives the mobile agent advertisement, and recognizes the sender MAC/IP addresses thereof as the normal FA, being the destination of the position registration and the destination of the user packet.

The mobile node (MN) 2 having recognized the IP address of the IP tunnel router 8a as the FA address creates a position registration message including the IP address information of the known HA control server 9, and transmits the message to the MAC/IP addresses of the mobile agent advertisement sender (reference numeral 25 in FIG. 9).

The IP tunnel router 8a receives the position registration message, detects that this message is a Mobile IP related message from a UDP port number (the UDP port number in the Mobile IP signaling is fixed to 434), and transfers this message to the FA control server 7 (reference numeral 29 in FIG. 9). For this transfer, a signaling transfer mechanism specified between the MGC and MG is used. In the case of the Mobile IPv6, the Mobile IP signaling is identified by the option type of the IPv6 receiver option header. The FA control server 7a handles the transferred Mobile IP signaling as if it is received from the mobile node (MN) 2.

The IP tunnel router constituting the virtual FA serves as the FA with respect to the mobile node (MN) 2, and when having received the Mobile IP message from the mobile node (MN) 2, transfers this message to the FA control server. The FA control server having received the Mobile IP message from the HA control server transfers this message to the IP tunnel router, and the IP tunnel router delivers this message to the mobile node (MN) 2. By this mechanism, a Mobile IP network in which the control plane and the user plane are separated totally from the FA to the HA can be constructed. The mobile node (MN) 2 can accommodate the normal Mobile IP node.

Sixth Embodiment

Figure 11:
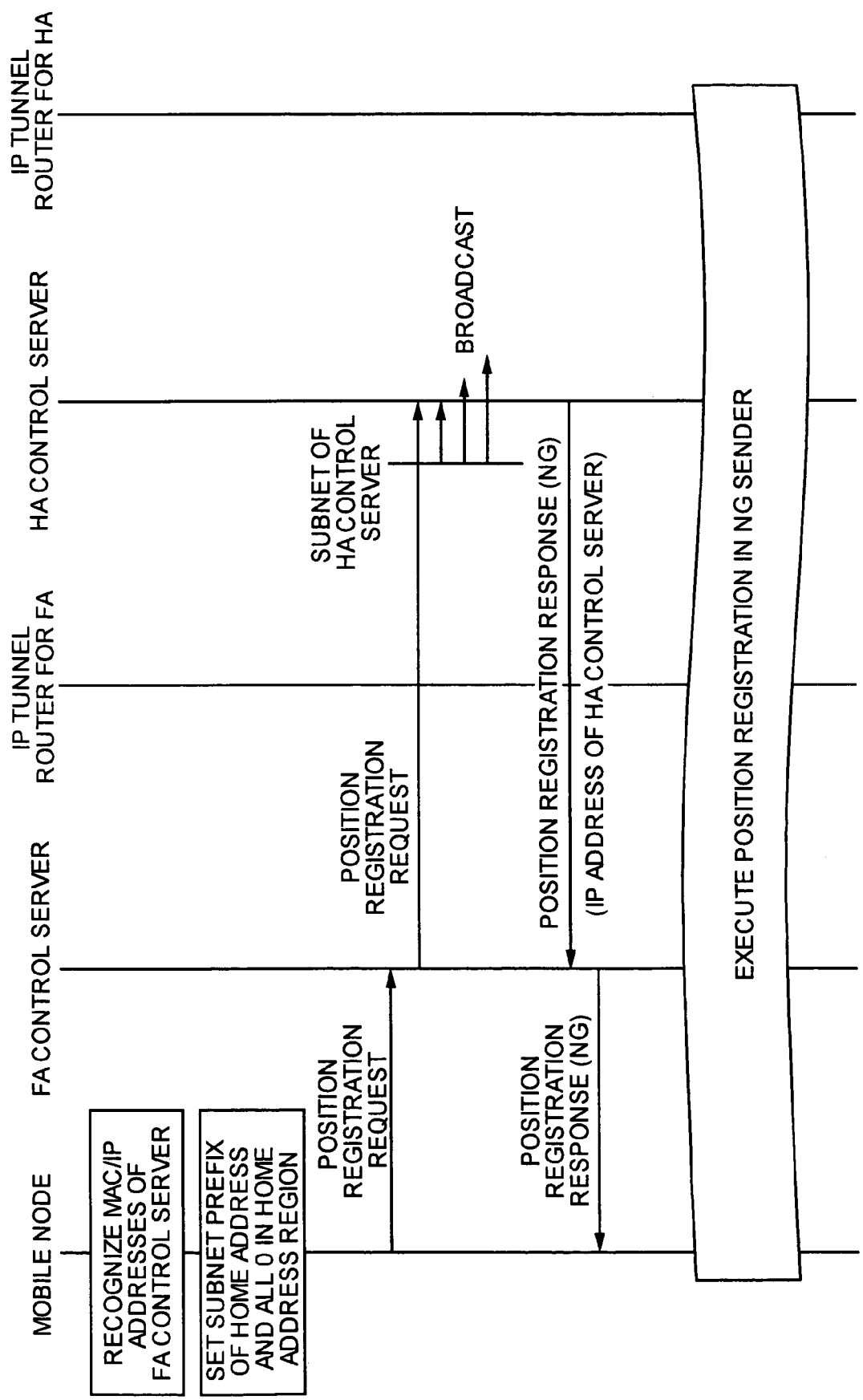
FIG. 11 illustrates a flow for obtaining the IP address of an HA control server in the distributed Mobile IP in the sixth embodiment of the present invention.

FIG. 11 illustrates the operation flow of each apparatus at the time of obtaining the address of the HA control server by the mobile node (MN) 2 in the Mobile IPv4 according to the sixth embodiment. In this embodiment, it is assumed that the mobile node (MN) 2 does not know the IP address of the HA control server, and an automatic acquisition mechanism of the IP address of the HA control server is specified.

The mobile node (MN) 2, which does not know the address of the HA control server creates a position registration message in which the subnet prefix of the home address and All 0 are set in the home address region, according to the specifications of the Mobile IP, and transmits this message to the subnet of the HA control server via the FA control server.

An edge router existing in the subnet of the HA control server broadcasts this message in the subnet. In the present invention, the HA control server captures the broadcast packet, and returns a response of rejecting the position registration in which the IP address of the HA control server is set.

The mobile node MN receives the rejection response of position registration, understands the IP address of the HA control server, and executes position registration toward the HA control server.

The HA control server responds (gives a rejection response) to the position registration of the Mobile IPv4 broadcasted in the HA subnet, thereby informing the mobile node (MN) 2 of the address of the HA control server. Therefore, in the Mobile IPv4 network in which the control plane and the user plane are separated, correspondence to an instance in which the mobile node (MN) 2 does not know the address of the HA control server becomes possible.

Seventh Embodiment

The seventh embodiment assumes a Mobile IPv6 network, in which the FA control server 7 in FIG. 1 is replaced by an AR control server as the network, and the virtual AR is formed of an AR control server and an IP tunnel router 8. Particularly, for the virtual AR, the one that supports the Mobile IP function is assumed.

In the seventh embodiment, the AR control server notifies the mobile node (MN) 2 of the own IP address, like the FA control server in the first embodiment. As in the third embodiment, the AR control server notifies the mobile node MN of the IP address of the IP tunnel router, being the default router, in addition to the own IP address. Further, as in the fourth embodiment, the IP tunnel router notifies the mobile node (MN) 2 of the IP address of the AR control server. As in the fifth embodiment, the Mobile IP message captured by the IP tunnel router is transferred to the AR control server, and the AR control server having received the Mobile IP message from the HA function transmits the Mobile IP message to the mobile node (MN) 2 via the IP tunnel router.

In the Mobile IP network in which the control plane and the user plane are separated, the load balancing between the control plane and the user plane becomes possible, thereby enabling independent correspondence to upgrade of signaling and speed-up of the tunnel processing. As a result, an optimized system can be constructed.

Eighth Embodiment

Figure 12:
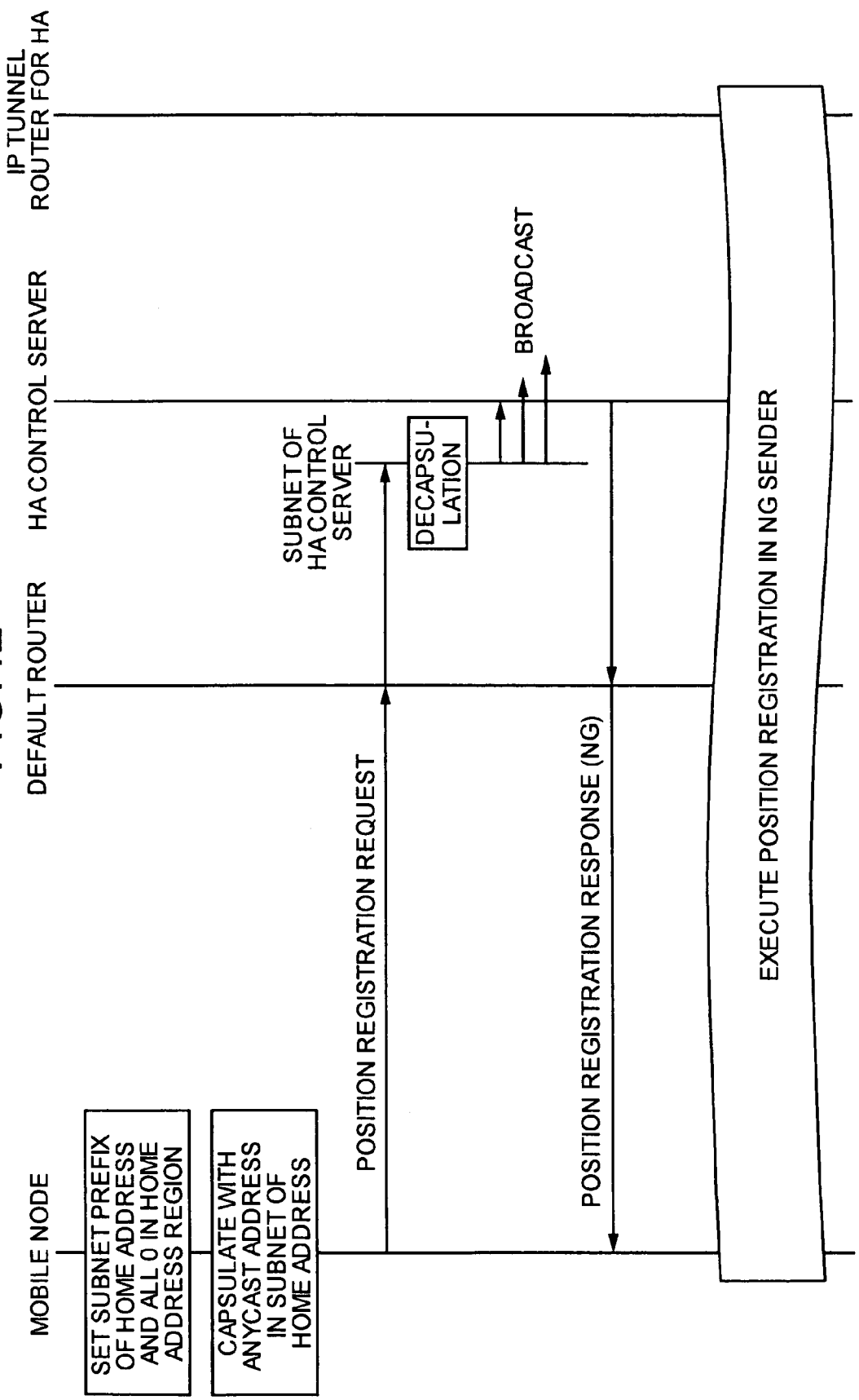
FIG. 12 illustrates a flow for obtaining the IP address of the HA control server in the distributed Mobile IP in the eighth embodiment of the present invention.

FIG. 12 illustrates the operation flow of each apparatus at the time of obtaining the HA control server address by the mobile node (MN) 2 in the Mobile IPv6 according to the eight embodiment.

The mobile node (MN) 2 that does not know the address of the HA control server creates a position registration message in which the subnet prefix of the home address and All 0 are set in the home address region, according to the specifications of the Mobile IP, encapsulates the message with an anycast address in the subnet of the home address, and transmits the message to the subnet of the HA control server.

This message is received by an optional router existing in the subnet of the HA control server, and the router performs decapsulation, and this message is broadcasted in the subnet. In the present invention, the HA control server captures the broadcasted packet, and returns a rejection response of position registration in which the IP address of the HA control server is set.

The mobile node (MN) 2 receives the rejection response of position registration, understands the IP address of the HA control server, and executes position registration toward the HA control server.

The mobile node (MN) 2 can recognize the FA control server and the IP tunnel router respectively independently. Therefore, a Mobile IP network in which the control plane and the user plane are separated totally from the mobile node (MN) 2 to the HA can be constructed.

In the Mobile IP network in which the control plane and the user plane are separated, the load balancing between the control plane and the user plane becomes possible, thereby enabling independent correspondence to upgrade of signaling and speed-up of the tunnel processing. As a result, an optimized system can be constructed.

In the Mobile IPv4 network in which the control plane and the user plane are separated, correspondence to an instance in which the mobile node (MN) 2 does not know the address of the HA control server becomes possible.

According to the present invention, the mobile node (MN) 2 can recognize the FA control server and the IP tunnel router respectively independently. Therefore, a Mobile IP network in which the control plane and the user plane are separated totally from the mobile node (MN) 2 to the HA can be constructed.

In the Mobile IP network in which the control plane and the user plane are separated, the load balancing between the control plane and the user plane becomes possible, thereby enabling independent correspondence to upgrade of signaling and speed-up of the tunnel processing. As a result, an optimized system can be constructed.

INDUSTRIAL APPLICABILITY

The mobility management method according to the distributed Mobile IP of the present invention is useful for mobility management in the mobile packet communication, and is particularly suitable for the Mobile IPv4 or Mobile IPv6 network.

The invention claimed is:

1. A mobility management system using a distributed Mobile IP, in a Mobile IP network which allows a mobile node while moving to hold a current communication session, comprising:
   a foreign agent control server that is located in a first subnet where the mobile node is located, performs Mobile IP signaling;
   a first IP tunnel router that is located in, the first subnet, and performs IP tunnel transfer;
   a home agent control server that is located in a second subnet where the mobile node is located, and performs Mobile IP signaling; and
   a second IP tunnel router that is located in the second subnet, and performs IP tunnel transfer, wherein
   the foreign agent control server and the first IP tunnel router constitute a virtual foreign agent, and
   the home agent control server and the second IP tunnel router constitute a virtual home agent.

2. The mobility management system according to claim 1, wherein
   the foreign agent control server transmits to the mobile node a message indicating an IP address of the foreign agent control server, and
   the first IP tunnel router transmits to the mobile node a message indicating an IP address of a default router.

3. The mobility management system according to claim 1, wherein
   the foreign agent control server, when receiving a first request for position registration from the mobile node, determines a first IP tunnel endpoint in the first IP tunnel router, and transmits a second request including the first request and an IP address of the first IP tunnel endpoint to the home agent control server,
   the home agent control server determines a second IP tunnel endpoint in the second IP tunnel router, sets the first IP tunnel endpoint and the second IP tunnel endpoint into the second tunnel router, and transfers to the foreign agent control server a response to the second request, and the foreign agent control server sets the second IP tunnel endpoint into the first IP tunnel router, and transfers to the mobile node the response.

4. The mobility management system according to claim 1, wherein the home agent control server receives a request including an IP address of a first IP tunnel endpoint being the mobile node, determines a second IP tunnel endpoint in the second IP tunnel router, and transmits to the mobile node a response to the request.

5. The mobility management system according to claim 1, wherein the foreign agent control server transmits to the mobile node a message indicating an IP address of the foreign agent control server and an IP address of the second IP tunnel router serving as a default router.

6. The mobility management system according to claim 1, wherein the first IP tunnel router serves as a default router for the mobile node, and transmits to the mobile node a message indicating an IP address of the default router and an IP address of the foreign agent control server.

7. The mobility management system according to claim 1, wherein the first IP tunnel router transfers, when receiving a first Mobile IP message transmitted by the mobile node, the first Mobile IP message to the foreign agent control server, the foreign agent control server transfers, when receiving a second Mobile IP message transmitted by the home agent control server, the second Mobile IP message to the first IP tunnel router, and the first IP tunnel router transfers the second Mobile IP message to the mobile node.

8. The mobility management system according to claim 1, wherein the mobile node transmits a request for position registration to the foreign agent control server so that the request is broadcasted over the second subnet, the home agent control server transmits to the foreign agent control server a response to the request, the response including an IP address of the home agent control server and indicating rejection to the position registration, and the foreign agent control server transfers to the mobile node the response.

9. The mobility management system according to claim 1, wherein the Mobile IP network is an IPv4 network.

10. A mobility management system using a distributed Mobile IP, in a Mobile IP network which allows a mobile node while moving to hold a current communication session, comprising:

an access router control server that is located in a first subnet where the mobile node is located, performs Mobile IP signaling;

a first IP tunnel router that is located in the first subnet, and performs IP tunnel transfer;

a home agent control server that is located in a second subnet where the mobile node is located, and performs Mobile IP signaling; and a second IP tunnel router that is located in the second subnet, and performs IP tunnel transfer, wherein the access router control server and the first IP tunnel router constitute a virtual access router, and the home agent control server and the second IP tunnel router constitute a virtual home agent.

11. The mobility management system according to claim 10, wherein the access router control server transmits to the mobile node a message indicating an IP address of the access router, and the first IP tunnel router transmits to the mobile node a message indicating an IP address of a default router.

12. The mobility management system according to claim 10, wherein the access router control server transmits to the mobile node a message indicating an IP address of the foreign agent control server and an IP address of the second IP tunnel router serving as a default router.

13. The mobility management system according to claim 10, wherein the first IP tunnel router serves as a default router for the mobile node, and transmits to the mobile node a message indicating an IP address of the default router and an IP address of the access router control server.

14. The mobility management system according to claim 10, wherein the first IP tunnel router transfers, when receiving a first Mobile IP message transmitted by the mobile node, the first Mobile IP message to the access router control server, the access router control server transfers, when receiving a second Mobile IP message transmitted by the home agent control server, the second Mobile IP message to the first IP tunnel router, and the first IP tunnel router transfers the second Mobile IP message to the mobile node.

15. The mobility management system according to claim 10, further a router located in the second subnet, wherein the mobile node transmits a request for position registration to the foreign agent control server so that the request is broadcasted over the second subnet, the request being encapsulated with an anycast address in the second subnet, the router receives and decapsulates the request, and broadcasts the request decapsulated over the second subnet, the home agent control server transmits to the router a response to the request broadcasted, the response including an IP address of the home agent control server and indicating rejection to the position registration, and the router transfers to the mobile node the response.

16. The mobility management system according to claim 10, wherein the Mobile IP network is an IPv6 network.

* * * * *